United States Patent
Ohtsuka et al.

(10) Patent No.: US 12,037,507 B2
(45) Date of Patent: Jul. 16, 2024

(54) RESIN COMPOSITION FOR GENERATING ALLYLPHENOL-MALEIMIDE COPOLYMER FOR ELECTRONIC COMPONENT PROTECTIVE FILM, AND ELECTRONIC COMPONENT PROTECTIVE FILM COMPRISING THIS COPOLYMER

(71) Applicants: OSAKA RESEARCH INSTITUTE OF INDUSTRIAL SCIENCE AND TECHNOLOGY, Izumi (JP); KOA CORPORATION, Ina (JP)

(72) Inventors: Keiko Ohtsuka, Osaka (JP); Morio Yonekawa, Osaka (JP); Hajime Kimura, Osaka (JP); Ken Yoshioka, Nagano (JP); Nobuhiro Kanamaru, Nagano (JP); Masaki Suwa, Nagano (JP); Kazumi Machida, Nagano (JP)

(73) Assignees: Osaka Research Institute of Industrial Science and Technology, Osaka (JP); KOA Corporation, Nagano (JP)

( * ) Notice: Subject to any disclaimer, the term of this patent is extended or adjusted under 35 U.S.C. 154(b) by 572 days.

(21) Appl. No.: 17/287,772

(22) PCT Filed: Nov. 5, 2019

(86) PCT No.: PCT/JP2019/043221
§ 371 (c)(1),
(2) Date: Apr. 22, 2021

(87) PCT Pub. No.: WO2020/095882
PCT Pub. Date: May 14, 2020

(65) Prior Publication Data
US 2021/0388227 A1 Dec. 16, 2021

(30) Foreign Application Priority Data

Nov. 5, 2018 (JP) ................. 2018-208444

(51) Int. Cl.
| | | |
|---|---|---|
| C08K 3/22 | (2006.01) |
| C08F 212/34 | (2006.01) |
| C08F 234/00 | (2006.01) |
| C09D 7/61 | (2018.01) |
| C09D 125/18 | (2006.01) |
| C09D 145/00 | (2006.01) |
| H01B 3/30 | (2006.01) |
| H01C 7/00 | (2006.01) |

(52) U.S. Cl.
CPC .......... *C09D 125/18* (2013.01); *C08F 212/34* (2013.01); *C08F 234/00* (2013.01); *C08K 3/22* (2013.01); *C09D 7/61* (2018.01); *C09D 145/00* (2013.01); *H01B 3/303* (2013.01); *H01C 7/005* (2013.01); *C08K 2003/2227* (2013.01)

(58) Field of Classification Search
CPC ...... C09D 125/18; C09D 7/61; C09D 145/00; C09D 165/04; C08F 212/34; C08F 234/00; C08K 3/22; C08K 2203/2227; C08K 7/18; H01B 3/303; H01C 7/005; H01C 1/028; H01C 17/02; H01C 17/06; H01C 17/06586; C08G 2261/1414; C08G 2261/1422; C08G 2261/143; C08G 2261/3424; C08G 61/025
USPC ........................................... 524/430
See application file for complete search history.

(56) References Cited

U.S. PATENT DOCUMENTS

| | | | |
|---|---|---|---|
| 5,003,018 A | 3/1991 | Repecka | |
| 2007/0230235 A1* | 10/2007 | Abe ........................ H01L 27/13 |
| | | | 257/E27.113 |
| 2013/0122768 A1 | 5/2013 | Harada et al. | |

FOREIGN PATENT DOCUMENTS

| | | |
|---|---|---|
| CN | 103025775 A | 4/2013 |
| JP | H02-64113 A | 3/1990 |
| JP | H02-113006 A | 4/1990 |
| JP | 2014-114368 A | 6/2014 |
| JP | 2015-119125 A | 6/2015 |
| WO | WO 2016/002704 A1 | 1/2016 |

OTHER PUBLICATIONS

English Machine Translation of JP 02-113006. (Year: 1990).*
International Search Report, English translation, and Written Opinion in Application No. PCT/JP2019/043221, dated Feb. 4, 2020, 7 pages.

* cited by examiner

*Primary Examiner* — Hannah J Pak
(74) *Attorney, Agent, or Firm* — Crowell & Moring LLP

(57) ABSTRACT

This invention provides a resin composition for preparing an allylphenol-maleimide copolymer used for a protective film for an electronic component including: (A) an allyl group-containing phenol compound having a rigid structure; (B) an N-aromatic maleimide group-containing compound having a rigid structure; and (C) an N-aliphatic maleimide group-containing compound having a flexible structure.

8 Claims, 10 Drawing Sheets

RESIN COMPOSITION FOR GENERATING ALLYLPHENOL-MALEIMIDE COPOLYMER FOR ELECTRONIC COMPONENT PROTECTIVE FILM, AND ELECTRONIC COMPONENT PROTECTIVE FILM COMPRISING THIS COPOLYMER

This application is a 371 application of PCT/JP2019/043221 having an international filing date of Nov. 5, 2019, which claims priority to JP2018-208444 filed Nov. 5, 2018, the entire content of each of which is incorporated herein by reference.

TECHNICAL FIELD

The present invention relates to a resin composition for preparing an allylphenol-maleimide copolymer used for a protective film for an electronic component, a method for producing an allylphenol-maleimide copolymer from such resin composition, and a protective film for an electronic component made of a resin composition containing an allylphenol-maleimide copolymer.

BACKGROUND ART

In recent years, electronically-controlled automobiles, such as electric vehicles (EV) and hybrid vehicles (VH), are increasing. Electronic control units (ECUs) mounted on such electronically-controlled automobiles would be exposed to the more severe temperature environment because of direct mounting on engine and electromechanical integration; i.e., an electronic component is integrated into engine. In the future, ECUs would be mounted on a substrate together with the SiC semiconductor or GaN semiconductor that acts at 250° C., and the equivalent level of heat resistance would be required for a resistor, which is a passive component.

For example, Patent Document 1 discloses a chip resistor including electrode structure that would not be deteriorated even if such resistor is operated at high temperature of approximately 250° C. to 350° C. for a long period of time.

PRIOR ART DOCUMENTS

Patent Documents

[Patent Document 1] JP 2015-119125 A

SUMMARY OF THE INVENTION

Objects to be Attained by the Invention

The resistor as disclosed in Patent Document 1 includes a pair of electrodes on an insulative substrate made of alumina or the like, and a resistance element is formed to bridge over the pair of electrodes.

In addition, the resistance element is covered by a glass protective film, the upper surface thereof is covered by the outermost protective film made of glass or resin, and end-face electrodes are formed on the end-faces of the substrate.

The outermost protective film is made of glass or epoxy resin.

A glass protective film needs to be baked at high temperature, and resistance values may be thus adversely affected by mutual diffusion between materials. In addition, it is difficult that a protective film made of epoxy resin is equipped with satisfactory heat resistance because of its chemical structure.

It is an object of the present invention to provide a novel protective film for an electronic component that is excellent in heat resistance. It is another object of the present invention to provide a protective film for an electronic component that can be cured at low temperature within a short period of time.

Means for Attaining the Objects

An aspect of the present invention provides a resin composition for preparing an allylphenol-maleimide copolymer used for a protective film for an electronic component including: (A) an allyl group-containing phenol compound having a rigid structure; (B) an N-aromatic maleimide group-containing compound having a rigid structure; and (C) an N-aliphatic maleimide group-containing compound having a flexible structure.

Preferably, Compound (A) is represented by Formula 1 below, Compound (B) is represented by Formula 2 below, and Compound (C) is represented by Formula 3 below.

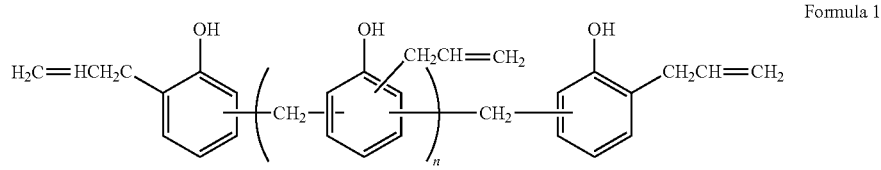

Formula 1

(wherein n is 0 to 2)

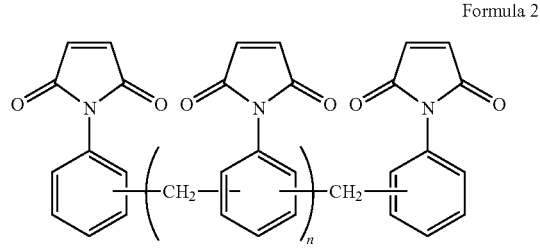

Formula 2

(wherein n is 0 to 2)

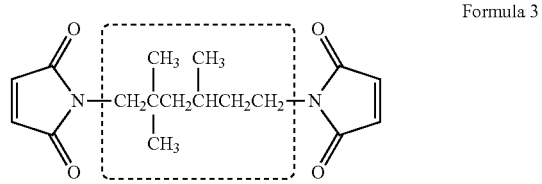

Formula 3

The ratio of the allylphenol compound having a rigid structure (A) to the total of the maleimide compound having a rigid structure (B) and the maleimide compound having a flexible structure (C) is preferably 1:1 to 1:3 in terms of an equivalence ratio.

The ratio of the maleimide compound having a rigid structure (B) to the maleimide compound having a flexible structure (C) is preferably 1:0.6 to 1:1.6 in terms of an equivalence ratio.

The composition can further contain inorganic fillers. Examples of inorganic fillers include alumina, magnesium oxide, and silica, with spherical alumina particles being preferable.

The spherical alumina particles have diameter of approximately 0.1 to 10 μm. Two types of particles, such as particles having diameters of approximately 0.1 to 0.5 μm and particles having diameters of approximately 1 to 10 μm, may be used.

The ratio of the total content rate of Compounds (A), (B), and (C) to the content rate of the inorganic fillers is preferably 50%:50% to 25%:75% by weight.

The present invention further provides a method for producing an allylphenol-maleimide copolymer used for a protective film for an electronic component including a step of curing the resin composition of any one of aspects described above via heating.

The step of curing via heating can be carried out at 200° C. to 250° C. for approximately 15 to 30 minutes. For example, the step of curing can include two steps of heat treatment within a short period of time, such as heating at 200° C. for 10 minutes and heating at 250° C. for 10 minutes.

The present invention further provides a protective film for an electronic component including an allylphenol-maleimide copolymer, which is a heat-cured product of the resin composition (it is also simply referred to as a "cured resin product").

The present invention further provides use of an allylphenol-maleimide copolymer for a second protective film of an electronic component including an insulative substrate, a pair of electrodes formed to face at least one surface of the insulative substrate, a resistance element that electrically connect the pair of electrodes, a first protective film that covers the resistance element, and a second protective film that covers the first protective film.

This description includes part or all of the content as disclosed in the description and/or drawings of Japanese Patent Application No. 2018-208444, which is a priority document of the present application.

Effects of the Invention

The present invention can provide a novel protective film for an electronic component that is excellent in heat resistance and in moisture resistance. The present invention can also provide a protective film for an electronic component that can be cured at low temperature within a short period of time.

EMBODIMENTS OF THE INVENTION

Figure 1:
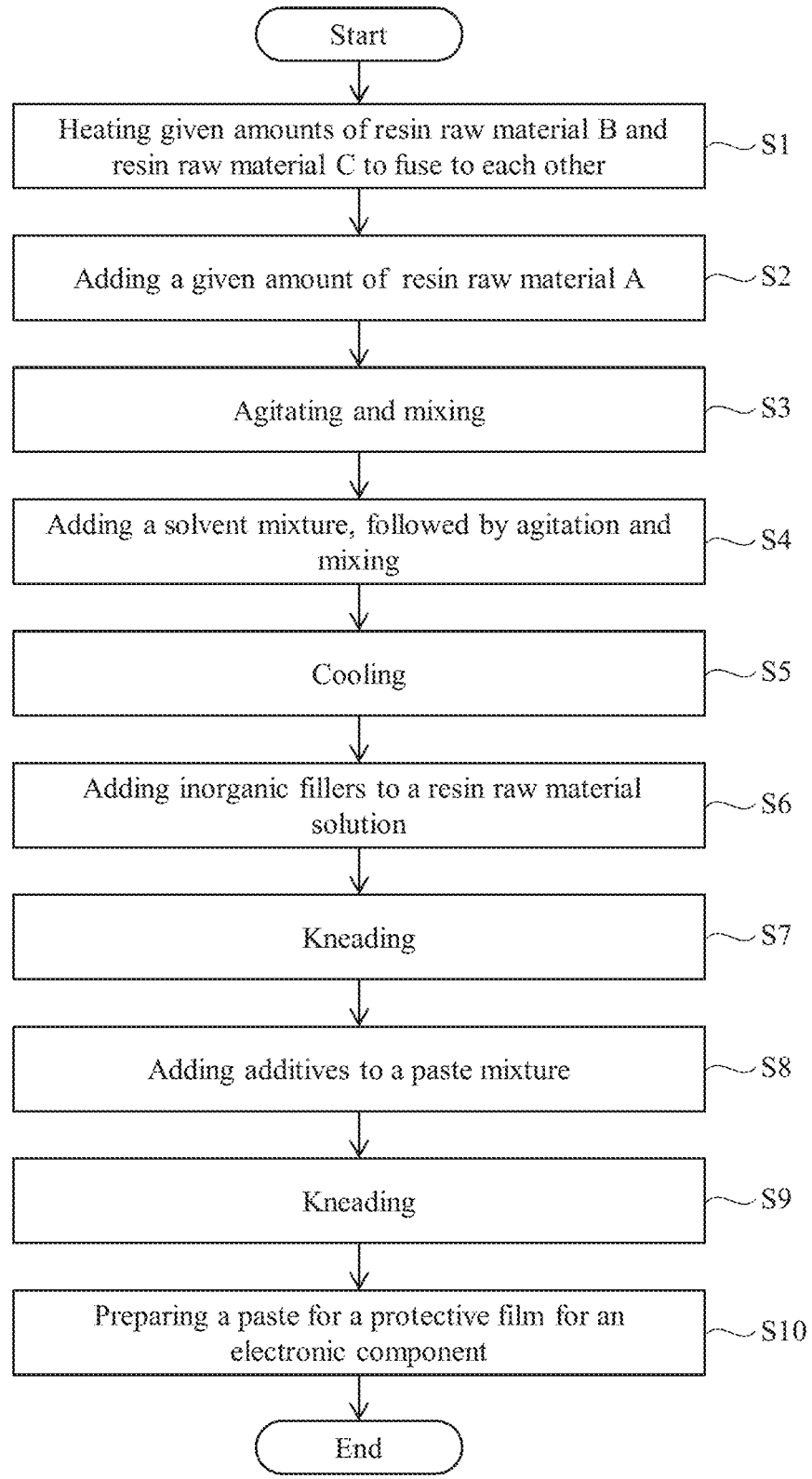
FIG. 1 illustrates an embodiment of a step of producing a resin composition for preparing an allylphenol-maleimide copolymer used for a protective film for an electronic component according to an embodiment of the present invention ("a cured resin product used for a protective film for an electronic component").

The resin composition for preparing an allylphenol-maleimide copolymer used for a protective film for an electronic component according to the present invention is a three-component allylphenol-maleimide-based resin composition including an allylphenol resin composition having a rigid molecular structure and two types of maleimide resin compositions each having a rigid molecular structure and a flexible molecular structure. With the use of the copolymer prepared from such resin composition, a protective film for an electronic component provided with high heat resistance resulting from a rigid structure and high toughness resulting from a flexible structure can be provided.

In addition, internal stress of the protective film for an electronic component can be reduced with the use of resin having a flexible structure, the adhesive force to an electrode or substrate can be enhanced, and invasion of moisture from the protective film interface can be prevented. Thus, high moisture resistance can be achieved.

(1) The Composition According to the Present Embodiment

The resin composition according to the present embodiment involves the use of bismaleimide resin having higher heat resistance than conventional epoxy resin, and such composition has overcome fragility of the bismaleimide resin.

Specifically, heat resistance is achieved by introducing a rigid structure, such as a phenol ring, maleimide ring, or benzene ring.

In addition, toughness (flexibility) is achieved by introducing a linear, saturated hydrocarbon chain structure. Thus, internal stress is relieved and adhesion strength is enhanced.

In the manner described above, the resin composition for preparing an allylphenol-maleimide copolymer used for a protective film for an electronic component according to the present invention can enhance adhesion between a resistance element and a protective film and adhesion between an electrode and a protective film, and moisture resistance can be thus improved.

The procedure for optimizing a resin composition is as described below:
  a) Step 1: selection of a resin raw material that may have both high heat resistance and high moisture resistance;
  b) Step 2: optimization of a resin composition that has both high heat resistance and high moisture resistance; and
  c): Step 3: optimization of a resin composition using the determined resin composition.

A raw material composition of a resin composition is, for example, as described below.
(Vehicle)
  Resin raw material
  Curing catalyst
  Solvent
  Additives: 1) rheology control agent; 2) dispersant; and 3) antifoaming agent
  These additives are adequately selected in accordance with desired properties of the resin composition (resin paste). In addition thereto, a surface conditioner or the like may be added.
(Filler)
  Examples of fillers include alumina, magnesium oxide, and silica, with alumina being preferable from the viewpoints of cost and chemical stability. A preferable form of a filler is spherical, and a particle diameter can be approximately 0.1 to 10 μm. For example, more preferable spherical alumina particles have diameters within the range of approximately 0.1 to 10 μm. Two types of particles: particles with diameters within the range of approximately 0.1 to 0.5 μm (e.g., the average particle diameter of approximately 0.3 μm) and particles with diameters within the range of approximately 1 to 10 μm (e.g., the average particle diameter of approximately 4 μm), can be used.
(Inorganic Filler)
  Effects achieved by inclusion of inorganic fillers are as described below.

The resin composition contains inorganic fillers (alumina spherical particles) with a low linear expansion coefficient, so that a linear expansion coefficient can be reduced.

When the resin composition (resin paste) contains such inorganic fillers in an amount of 75% by weight, in particular, a linear expansion coefficient can be adjusted to a level equivalent to the linear expansion coefficient attained by soldering (approximately 20) and a linear expansion coefficient (17) closer to that of an alumina substrate (approximately 7) or glass (3 to 10).

It is possible to form a protective film that has high heat shock resistance in addition to high heat resistance, so that a protective film is sufficiently resistant to a temperature cycle (e.g., between −55° C. and 155° C.).

Hereafter, an embodiment of the resin composition is described. The resin composition according to the present embodiment includes the raw materials 1) to 3) described below. Such resin raw materials are selected as materials that can have both high heat resistance and high moisture resistance.

1) Raw Material A: Allyl Group-Containing Phenol Compound (Allylated Novolak)

For example, the allyl group-containing phenol compound (allylated novolak) illustrated below is a diallylphenol compound having a rigid structure, and it may be composed of 2 or more allylphenol structures and linear carbon chains each having 1 or more carbon atoms (e.g., C1 to C6, and preferably C1) linking the allylphenol structures.

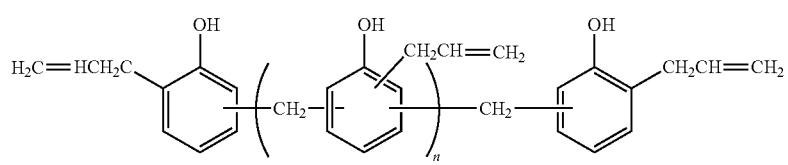

Formula 1

(wherein n is 0 to 2)

The chemical structure illustrated above has lower rigidity than N-aromatic maleimide. Thus, it can impart resin with toughness while maintaining heat resistance.

Examples of alternative materials of Raw material A include the following.
  Allylphenol Novolak
  2,2'-Diallyl Bisphenol A

2) Raw Material B: N-Aromatic Maleimide Group-Containing Compound ((Polymer-Type) Phenylmethane Maleimide)

For example, the N-aromatic maleimide group-containing compound ((polymer-type) phenylmethane maleimide)

illustrated below may be composed of 2 or more rigid N-aromatic maleimide structures and a —CH$_2$— carbon chain linking the N-aromatic maleimide structures.

Formula 2

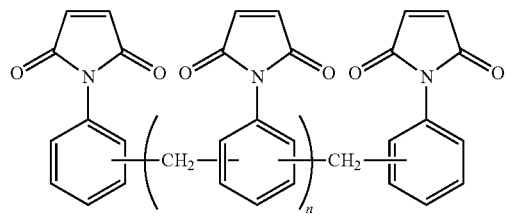

(wherein n is 0 to 2)

The chemical structure illustrated above is N-aromatic maleimide having a rigid structure. Thus, the resulting resin product can achieve enhanced heat resistance, although the cured product is likely to be fragile.

Examples of alternative materials of Raw material B include the following.
4,4'-Diphenylmethane bismaleimide
m-Phenylene bismaleimide
Bisphenol A diphenyl ether bismaleimide
3,3'-Dimethyl-5,5'-diethyl-4,4'-diphenylmethane bismaleimide
4-Methyl-1,3-phenylene bismaleimide
4,4'-Diphenyl ether bismaleimide
4,4'-Diphenyl sulfone bismaleimide
1,3-Bis(3-maleimide phenoxy)benzene
1,3-Bis(4-maleimide phenoxy)benzene 3) Raw Material C: N-Aliphatic Maleimide Group-Containing Compound
(1,6-Bismaleimide-(2,2,4-Trimethyl)Hexane)

For example, the N-aliphatic maleimide group-containing compound (1,6-bismaleimide-(2,2,4-trimethyl)hexane) illustrated below may be composed of 2 or more maleimide structures and linear carbon chains each having 1 or more carbon atoms (e.g., C1 to C10, and preferably C6) linking the maleimide structures.

Formula 3

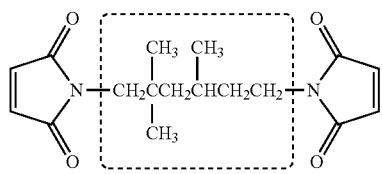

The chemical structure illustrated above is N-aliphatic maleimide having a flexible structure. Thus, the resulting resin product can achieve enhanced toughness, although heat resistance is deteriorated.

Examples of alternative materials of Raw material C include the following.
1,6-bismaleimide-(2,2,4-trimethyl)hexane
1,6-bismaleimide-(2,4,4-trimethyl)hexane
N,N'-decamethylene bismaleimide
N,N'-octamethylene bismaleimide
N,N'-hexamethylene bismaleimide
N,N'-trimethylene bismaleimide
N,N'-ethylene bismaleimide

TABLE 1

| Sample | Ratio of resin raw material composition |
|---|---|
| 1 | A:B1 = 1:1 |
| 2 | A:B1 = 1:1.8 |
| 3 | A:B2 = 1:1.2 |
| 4 | A:B2 = 1:1.8 |
| 5 | A:B1:B2 = 1:0.6:0.6 |
| 6 | A:B1:B2 = 1:0.8:0.8 |
| 7 | A:B1:B2 = 1:1:1 |
| 8 | A:B1:B2 = 1:1.5:1.5 |
| 9 | A:B1:B2 = 1:0.6:1 |
| 10 | A:B1:B2 = 1:1:0.6 |
| 11 (MP1) | A:B1:B2 = 1:1:0.6<br>Al2O3: 50 wt % |
| 12 (MP3) | A:B1:B2 = 1:1:0.6<br>Al2O3: 75 wt % |

Table 1 illustrates examples of the ratio of resin raw material compositions. Table 1 illustrates Sample 1 to Sample 12.

Examples of paste raw material compositions of optimized conditions including the resin raw material compositions illustrated in Table 1 and curing conditions are described below.

(Vehicle)
Optimal resin raw material composition: A:B:C=1:1:0.6 (equivalence ratio)
Range of resin raw material compositions:
    A/(B+C)=allylphenol compound: bismaleimide compound=1:1 to 1:3
    B:C=1:0.6 to 1:1.6
Curing catalyst: none
Composition ratio of resin raw materials (A+B+C) to solvent: 75:25 (weight ratio)
Solvent composition:
    BCA (butyl carbitol acetate, bp: approximately 250° C.: EC (ethyl carbitol, bp: approximately 200° C.)=25:75 (weight ratio)
Additives: 1) rheology control agent (e.g., organic material); 2) dispersant (e.g., urethane based); and 3) anti-foaming agent (e.g., polymer based)

(Filler)
Fused spherical alumina particles (particles with average diameter of 4 µm in combination with particles with average diameter of 0.3 µm)

(Vehicle-Filler Composition)
1) MP1: 50:50 (weight ratio)
2) MP3: 25:75 (weight ratio)

Curing conditions are as described below.
Curing is carried out by short-term 2 steps, such as 200° C. for 10 minutes and 250° C. for 10 minutes.

In order to reduce a production cost, curing is preferably carried out at 250° C. or lower within 30 minutes.

Subsequently, a method for producing a resin paste is described with reference to FIG. 1.

Step of Vehicle Production
Given amounts of the resin raw material B and the resin raw material C are heated at 150° C. to fuse to each other (Step S1). A given amount of the resin raw material A is added to the fused resin mixture, the mixture is agitated at 100° C. to 150° C. to obtain a homogeneous mixture, a solvent mixture (BCA (butyl carbitol acetate, bp: approximately 250° C.): EC (ethyl carbitol, bp: approximately 200° C.)=25:75) is added thereto (Step S2), the mixture is agitated at 100° C. to 150° C. to obtain a homogeneous mixture (Step S3), and the resultant is slowly and naturally cooled to room temperature to obtain a homogeneous solution of resin raw materials (Steps S4 and S5).

Step 1 of Producing Resin Paste

To the solution of resin raw materials obtained (10 g), a total of 10 g or 30 g of alumina fillers (produced by Denka: fused spherical alumina DAW-03 (d50=4 μm), ASFP-20 (d50=0.3 μm)) are added (Step S6), and the mixture is kneaded using a planetary centrifugal mixer and a 3-roll mixer (Step S7) to prepare a paste resin composition (mixture). In this case, 0.5 to 1.5 g of a moistening dispersant may be added.

Step 2 of Producing Resin Paste

To the paste resin composition (mixture) obtained, a moistening dispersant, a rheology control agent, and an antifoaming agent are added (Step S8), and the mixture is kneaded using a planetary centrifugal mixer (Step S9) to prepare a resin composition (a paste used for a protective film for an electronic component) (Step S10).

Step of Producing Protective Film

The resin composition is screen-printed to cover the top of the resistance element and a part of the electrodes formed on the alumina insulative substrate or the like, followed by curing. The paste used for a protective film is cured at 200° C. for 10 minutes and 250° C. for 10 minutes.

In the manner described above, the cured resin product used for a protective film for an electronic component according to the present invention can be produced. Thickness of a protective film for an electronic component in the form of a cured resin product is preferably approximately 10 to 15 μm, such as approximately 12 μm.

Hereafter, the method of evaluation of properties of the cured resin product used for a protective film for an electronic component according to the present embodiment is described.

1) Method of Measuring the Shear Adhesion Strength Under Tensile Loading

Figure 2:
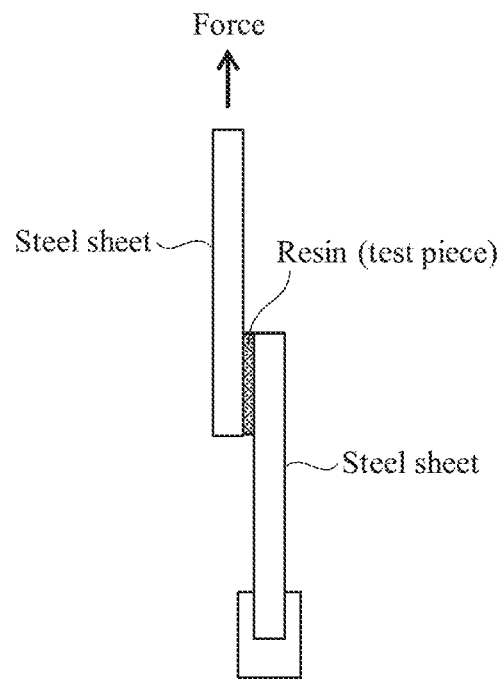
FIG. 2 illustrates a principle for measurement of the shear adhesion strength under tensile loading of the cured resin product used for the protective film for the electronic component according to the present invention.

FIG. 2 simply illustrates a principle for measurement of the shear adhesion strength under tensile loading of the cured resin product used for a protective film for an electronic component according to the present embodiment.

In accordance with JIS K 6850, test pieces of the resin according to the present invention were prepared and subjected to measurement.

At the outset, test pieces of cold-rolled steel sheets (length: 100 mm; width: 25 mm; thickness: 1.6 mm, JIS G3141 SPCC-SB) were subjected to delipidization with IPA (isopropyl alcohol), grinding using 240 grit SiC sandpaper, and then ultrasonic cleaning in IPA, followed by drying, for preliminary preparation.

Subsequently, sample solutions were prepared on the basis of resin compositions, parts of the 2 steel sheets were each coated with given amounts of the sample solutions (coated area: approximately 25 mm×12.5 mm), the 2 steel sheets were clipped with Gem clips in a manner such that the coated areas would overlap with each other, and the 2 steel sheets were pressure-bonded to each other. The spilled resin solution was removed and the pressure-bonded steel sheets were cured under given curing conditions. Thereafter, the test pieces were each exposed in H175, H200, H250, M85, and M60 tanks for 100 hours. The shear adhesion strength under tensile loading was measured using Autograph AGS-X 10 kN (Shimadzu Corporation), mounting the test pieces (n=5) on the apparatus as illustrated in FIG. 2, and measuring the maximal stress at break at ambient temperature of 23° C. and a loading velocity of 5 mm/min.

2) Method for Measurement of Fracture Toughness

Figure 3:
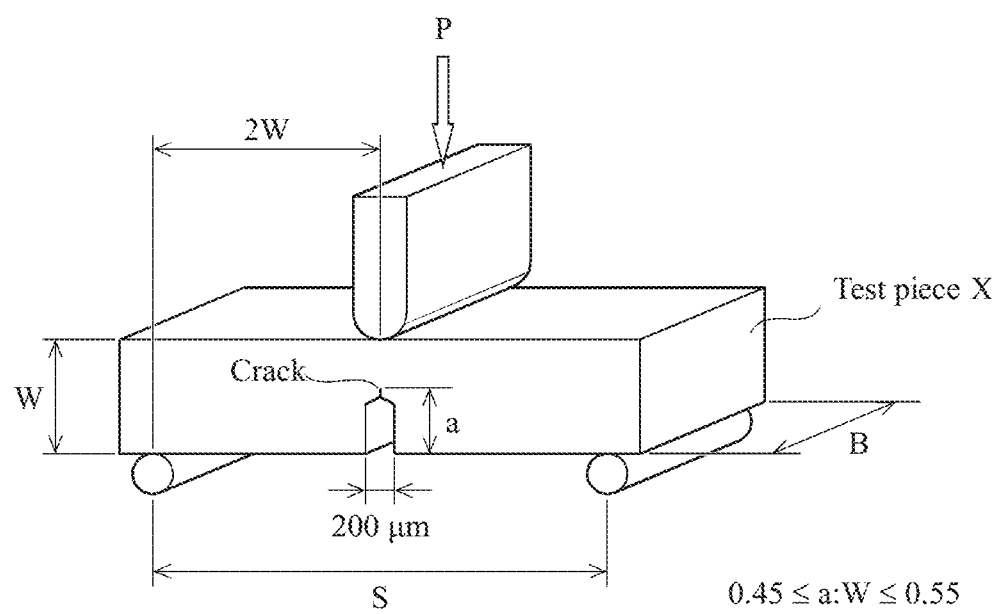
FIG. 3 illustrates a principle for measurement of fracture toughness of the cured resin product used for the protective film for the electronic component according to the present invention.

FIG. 3 illustrates a principle for measurement of fracture toughness of the cured resin product used for a protective film for an electronic component according to the present invention.

As illustrated in FIG. 3, test pieces (length: 40 mm; width: 5 mm; thickness: 3 mm) were cut from the cured product using a diamond cutter, and the sample surface was subjected to grinding with a SiC sandpaper (240 grit).

Thereafter, the samples were allowed to stand in an incubator (23° C.) for one day. FIG. 3 illustrates dimensions and the like using references.

The test piece X for fracture toughness measurement (see FIG. 3) was cut from the cured product using a micro-cutting machine, and the sample surface was subjected to grinding with a SiC sandpaper (240 grit). Subsequently, the test piece was notched using a microtome blade (0.45 to 0.55 mm). Thereafter, the test piece was allowed to stand in an incubator (23° C.) for one day. Fracture toughness was measured using Autograph AL5-X (Shimadzu Corporation) and the three-point bending jig in a compression mode. Subsequently, the obtained fracture load value was introduced into the predetermined formula of ASTM D5045-93 to determine the fracture toughness value.

[Table 2]

TABLE 2

| Sample | Ratio of resin raw material composition | Glass transition temperature (° C.) | Initial shear adhesion strength under tensile loading (Mpa) | Rate of change in shear adhesion strength under tensile loading after environment test for 100 hours (%) | | | | |
|---|---|---|---|---|---|---|---|---|
| | | | | H175 | H200 | H250 | M6 | M85 |
| 1 | A:B1 = 1:1 | 270 | 13 | −13.3 | — | — | — | −27.7 |
| 2 | A:B1 = 1:1.8 | No peak | 13 | −1.5 | — | — | — | −24.3 |
| 3 | A:B2 = 1:1.2 | 178 | 7.6 | −0.3 | — | — | — | −3.8 |
| 4 | A:B2 = 1:1.8 | 241 | 8.4 | +9.1 | — | — | — | −18.4 |
| 5 | A:B1:B2 = 1:0.6:0.6 | 266 | 9.5 | +5.1 | −5 | — | −20.6 | −15 |
| 6 | A:B1:B2 = 1:0.8:0.8 | 300 or higher | 9.5 | — | −14.5 | −46.6 | −14.3 | −6.3 |
| 7 | A:B1:B2 = 1:1:1 | 300 or higher | 7.0 | — | −18.1 | −38.4 | −19.5 | +7.0 |
| 8 | A:B1:B2 = 1:1.5:1.5 | 300 or higher | 6.7 | — | −10.2 | −45.2 | −18.2 | −16.7 |
| 9 | A:B1:B2 = 1:0.6:1 | 300 or higher | 8.0 | — | −2.6 | −67.4 | −14.7 | −10.0 |

TABLE 2-continued

| Sample | Ratio of resin raw material composition | Glass transition temperature (° C.) | Initial shear adhesion strength under tensile loading (Mpa) | Rate of change in shear adhesion strength under tensile loading after environment test for 100 hours (%) | | | | |
|---|---|---|---|---|---|---|---|---|
| | | | | H175 | H200 | H250 | M6 | M85 |
| 10 | A:B1:B2 = 1:1:0.6 | 300 or higher | 8.9 | — | −5.5 | −42.9 | −9.8 | −16.8 |
| ref | Epoxy resin product 1 | 95 | 10.0 | — | — | −81.1 | −25.2 | −21.1 |

Table 2 illustrates the results of the test for the shear adhesion strength under tensile loading of the samples before and after the heat resistance and moisture resistance tests conducted for 100 hours. As a control sample, an epoxy resin composition was used.

The indicators used to select optimal samples are as described below.

Indicator 1: Targeted glass transition temperature: 250° C. or higher

Indicator 2: Initial shear adhesion strength under tensile loading: equivalent to that of epoxy resin (10 pa)

Indicator 3-1: Targeted rate of change in the adhesion strength from before to after the (H175), H200, and H250 tests conducted for 100 hours: −50% or higher Indicator 3-2: Targeted rate of change in the adhesion strength from before to after the M60 and M85 tests conducted for 100 hours: −20% or higher The results demonstrate that the resin raw material composition of Sample 10 (A:B1:B2=1:1:0.6) satisfies the targeted values of the above 3 indicators and thus is close to the optimal composition.

Figure 4:
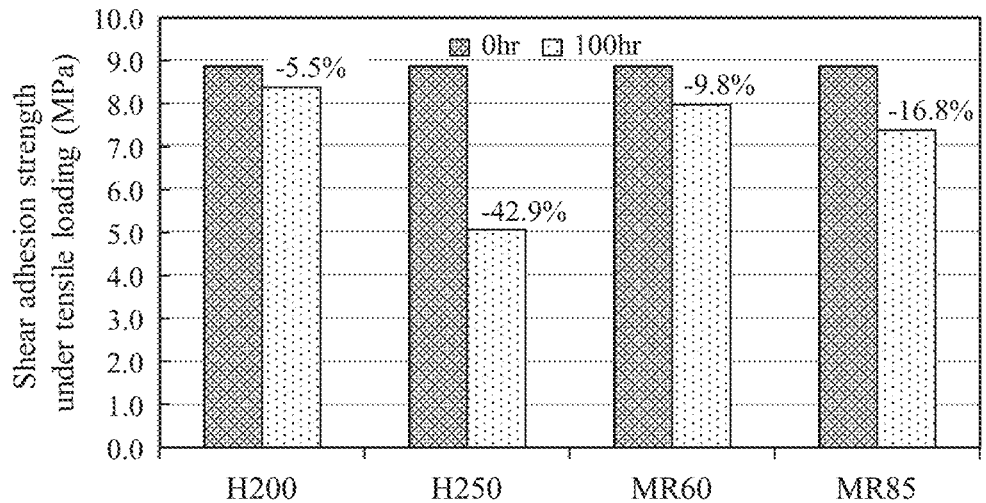
FIG. 4 illustrates the results of the test of the shear adhesion strength under tensile loading of the optimized cured resin product used for a protective film for an electronic component before and after the heat resistance and moisture resistance tests conducted for 100 hours (n=5).

FIG. 4 illustrates the results of the test of the shear adhesion strength under tensile loading of the cured resin product used for a protective film for an electronic component optimized above before and after the heat resistance and moisture resistance tests conducted for 100 hours (n=5).

While a rate of change in the adhesion strength from before to after the H200 test conducted for 100 hours was as low as −5.5%, a rate of change in the adhesion strength from before to after the H250 test conducted for 100 hours was as high as −42.9%.

A rate of change in the adhesion strength from before to after the M60 test and that from before to after the M85 test conducted for 100 hours were relatively low; i.e., −9.8% and −16.8%, respectively.

Thus, the allylphenol-maleimide copolymer optimized above is found to have both high heat resistance (200° C. or higher) and moisture resistance.

Figure 5:
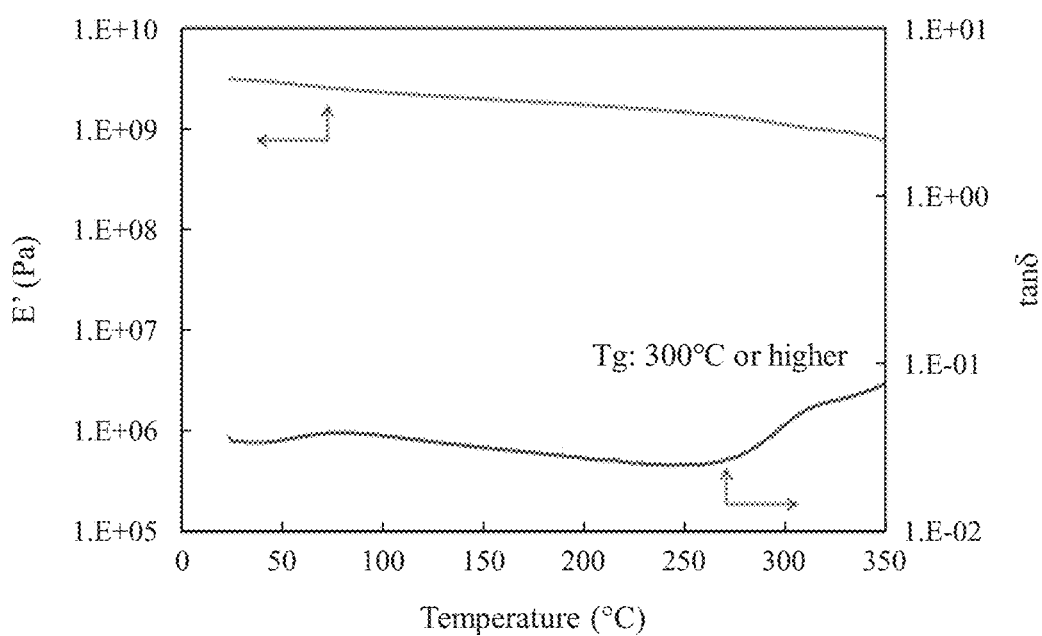
FIG. 5 illustrates thermal properties of the optimized cured resin product used for the protective film for the electronic component and the results of DMA measurement.
Figure 6:
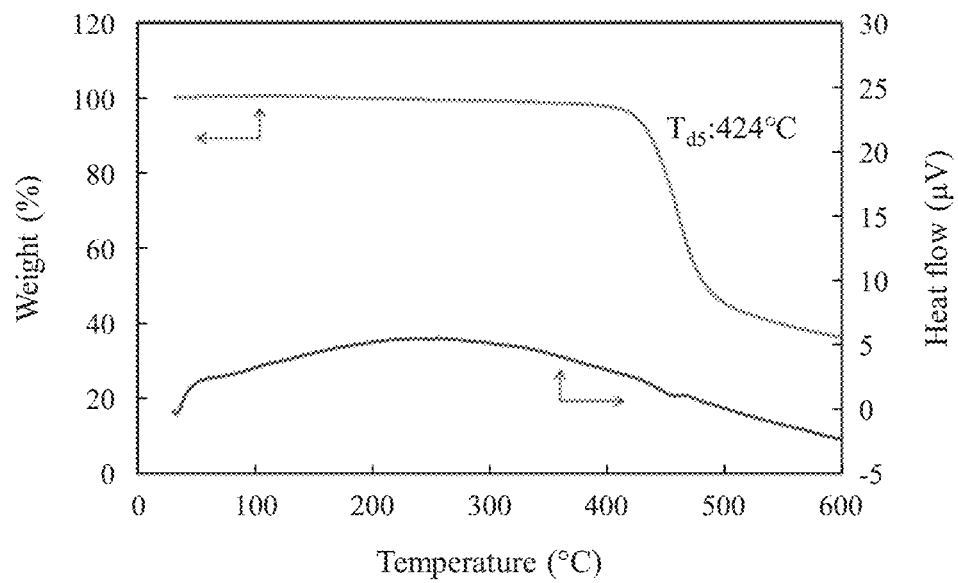
FIG. 6 illustrates thermal properties of the optimized cured resin product used for the protective film for the electronic component and the results of TG-DTA measurement.

FIG. 5 and FIG. 6 illustrate thermal properties of the optimized cured resin product used for a protective film for an electronic component. FIG. 5 illustrates the results of DMA measurement and FIG. 6 illustrates the results of TG-DTA measurement.

As illustrated in FIG. 5, the results of DMA measurement demonstrate that the optimized allylphenol-maleimide copolymer has Tg (glass transition temperature) of 300° C. or higher. This indicates that the physical heat resistance is high.

As illustrated in FIG. 6, the results of TG DTA measurement demonstrate that Td5 (the temperature when the thermogravimetric reduction reaches 5%) is 424° C. This indicates that the chemical heat resistance is high.

TABLE 3

| | a [mm] | S [mm] | B [mm] | W [mm] | a:W | F (a:W) | P [kN] | $K_{IC}$ |
|---|---|---|---|---|---|---|---|---|
| 1 | 4.93 | 40 | 2.97 | 10.1 | 0.488119 | 2.56490668 | 0.0282 | 0.960 | a: Crack length
S: Span
B: Test piece thickness
W: Test piece width
P: Load
$K_{IC}$: Fracture toughness value Table 3 illustrates the results of measurement of fracture toughness. $K_{IC}$ is found to be 0.960, which is equivalent to that of epoxy resin.

Figure 7:
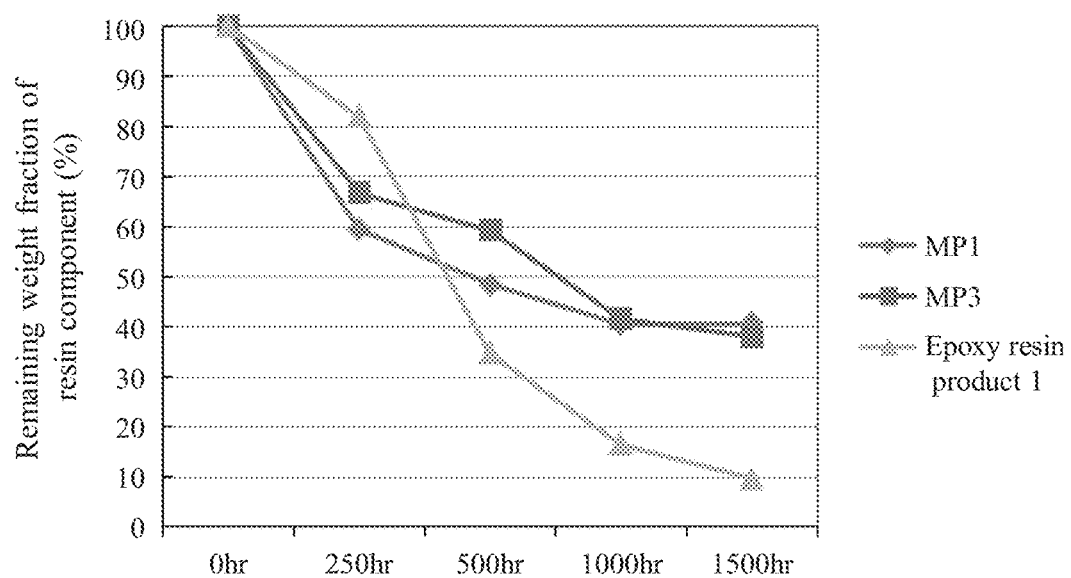
FIG. 7 illustrates remaining weight fractions upon heating at 250° C. of resin components in MP1 (Sample 11), MP3 (Sample 12), and the cured epoxy resin product from which the inorganic filler components had been removed (n=3).

FIG. 7 illustrates remaining weight fractions upon heating at 250° C. of resin components in MP1, MP3, and the cured epoxy resin product from which the inorganic filler components had been removed (n=3).

The remaining weight fractions of resin components of MP1 and MP3 (allylphenol-maleimide resin products), which are the products developed in the present embodiment, reach approximately 40% in H250 for 1,000 hours, but the weight reductions substantially reach a saturation.

The remaining weight fractions of resin components of the epoxy resin product 1 of a comparative example continues to decrease in H250 for 1,500 hours, and substantially no resin remains.

Thus, the optimized allylphenol-maleimide copolymer is less likely to undergo heat-induced deterioration of resin, compared to the epoxy resin product 1.

Figure 8:
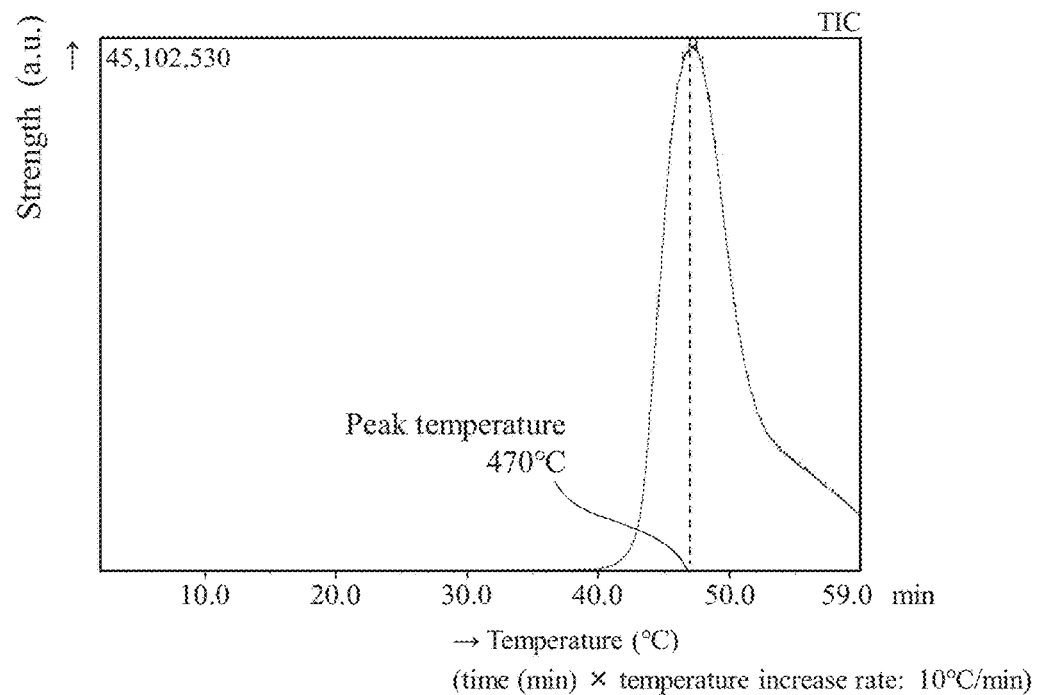
FIG. 8 illustrates the results of EGA-MS analysis and the results of analysis of the allylphenol-maleimide copolymer.
Figure 9:
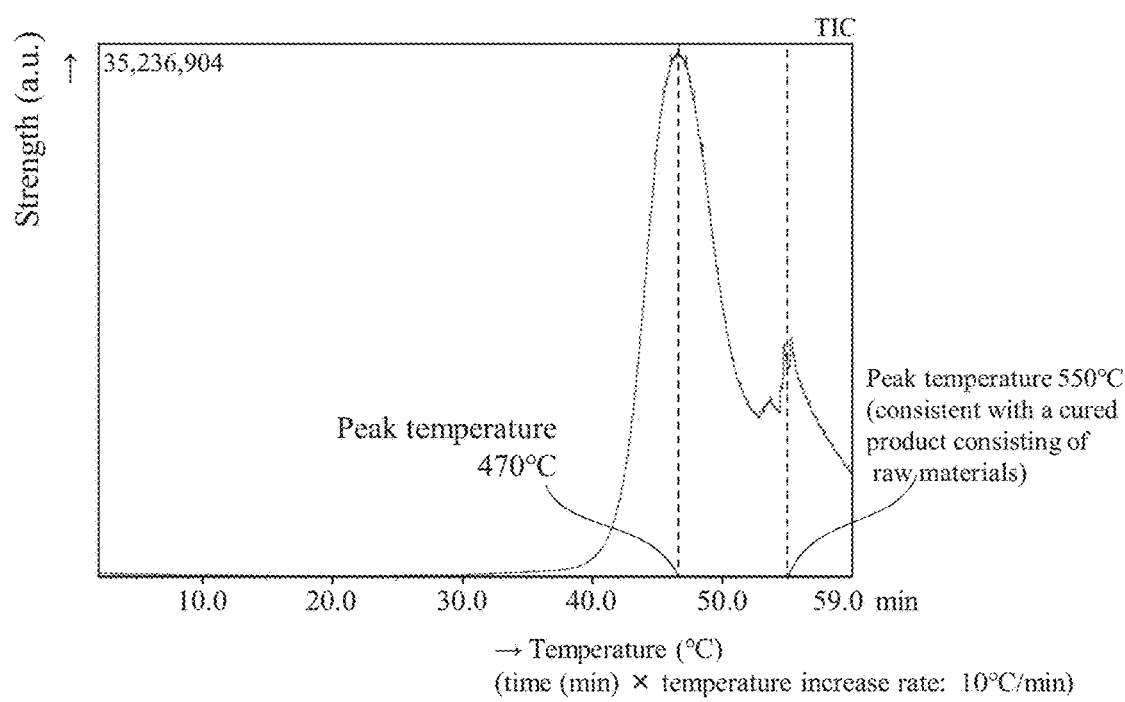
FIG. 9 illustrates the results of EGA-MS analysis and the results of analysis of the defective product (with an altered solvent composition).

FIG. 8 and FIG. 9 illustrate the results of EGA-MS analysis. FIG. 8 illustrates the results of analysis of the allylphenol-maleimide copolymer and FIG. 9 illustrates the results of analysis of the defective product (with an altered solvent composition).

The cured conditions of the copolymer were evaluated via evolved gas analysis (EGA-MS). In the past, the cured conditions of resin were simply evaluated via, for example, FT-IR, thermal analysis, HPLC, or Py-GC/MS. However, the allylphenol-maleimide copolymer according to the present embodiment is complicated in terms of the mechanism or the product of the curing reaction. Accordingly, it is impossible to obtain satisfactory data according to a conventional technique.

EGA-MS is a part of pyrolysis mass-spectrometry, which includes detecting the total amount of the evolved gas by connecting a heating furnace into which the sample is to be introduced to a mass spectrometer via a stainless-steel straight duct without separating them from each other. Since the mass spectra concern a mixture, such data are complicated. By comparing the mass spectra with the results of raw material analysis or the results of pyrolysis GC/MS (Py-GC/MS) analysis, the resin conditions can be analyzed. In addition, the results of analysis can be obtained within a period of approximately 1 hour without pretreatment such as extraction. Thus, such method of analysis is effective when analyses are performed under various many conditions.

EGA-MS Analysis

The cured product of the sample is adequately collected and grounded using a mortar or the like. The grounded sample (about 1 mg) was measured and introduced into a sample cup for analysis. The sample is mounted on the apparatus, introduced into a furnace preheated to 200° C., and retained therein for 20 minutes to remove a low-boiling point volatile component, such as a solvent. Thereafter, the temperature of the furnace is increased to 600° C. (10° C./min), and pyrogenic gas evolved during heating is detected via mass spectrometry.

In FIG. 8, the peak temperature is 470° C. In FIG. 9, peaks are observed at 470° C. and 550° C. The peak at 550° C. is consistent with the peak of the cured product including a raw material by itself.

Results of Analysis

The resin conditions are analyzed on the basis of the obtained strength, the position of the peak temperature appearing in the thermogram demonstrating the temperature (time) correlation, and the mass number data detected at peak points. The target allylphenol-maleimide copolymer resin is found to appear a peak at 470° C. by a preliminary analysis if the cured resin is in a normal state (FIG. 8).

The peak position detected upon analysis of a raw material and a cured product thereof and the detected mass were also analyzed in advance. On the basis of such information, whether or not the results of analysis on resin copolymers conducted by altering various conditions or compositions would be consistent with data of the peak position and the mass number illustrated in FIG. 8 was examined. When inconsistency in the data was observed, the data may be compared with the results of raw material analysis, and the occurrence of defects may be thus determined. FIG. 9 illustrates an example of analysis made on a composition with an altered solvent composition. A part of the raw material was precipitated before curing and a cured product of a raw material by itself was generated. In such a case, variations may occur in the strength, the adhesive force, and other properties. Thus, such conditions were determined to be inadequate for preparation of copolymers.

Also, remaining raw materials and other conditions can be examined. In this manner, EGA-MS analysis enables visualization of the resin structure in terms of the correlation between the degrading temperature and the strength of the resulting pyrogenic product.

As a result of the analyses described above, the optimized allylphenol-maleimide copolymer was found to be a candidate of a protective film for an electronic component excellent in heat resistance that could be cured at low temperature within a short period of time.

Subsequently, the results of application of the optimized allylphenol-maleimide copolymer to a resistor as an example of an electronic component are described.

Figure 10:
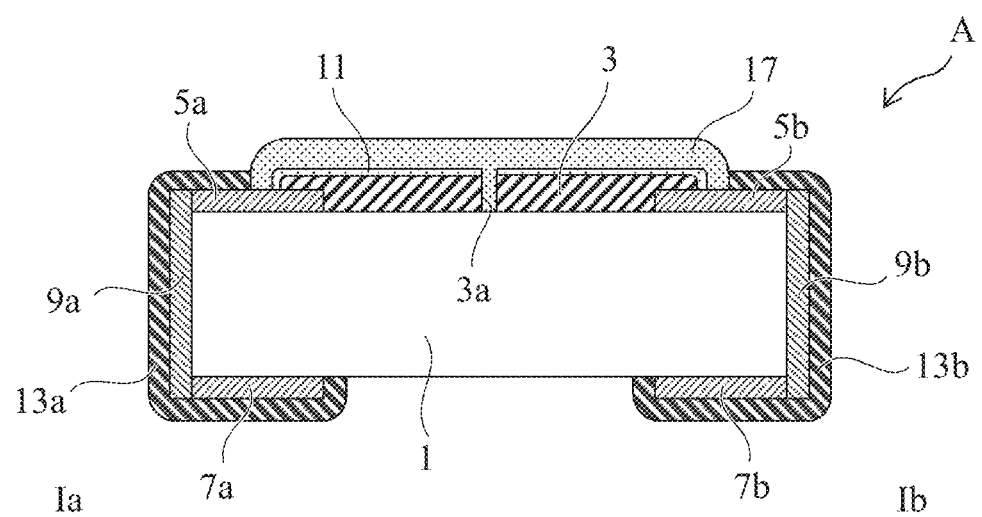
FIG. 10 illustrates a cross-sectional view illustrating an example of a configuration of a thick-film chip resistor exemplified as an electronic component to which the cured resin product used for a protective film for an electronic component according to the present invention can be applied as the final form of a protective film.

FIG. 10 illustrates an example of a configuration of a thick-film chip resistor exemplified as an electronic component to which the cured resin product used for a protective film for an electronic component according to the present embodiment can be applied as the final form of a protective film.

The thick-film chip resistor A illustrated in FIG. 10 includes an insulative substrate 1 and a resistance element 3 formed thereon. The resistance element 3 is provided with a trimming groove 3a formed by, for example, laser application by a step of trimming to adjust a resistance value. Before the step of trimming, a first protective film 11 that protects the resistance element 3 is formed. After the step of trimming, a protective film (second protective film) 17 that covers and protects the resistance element 3 and electrodes 5a and 5b from the external environment is prepared with the use of the optimized allylphenol-maleimide copolymer. The second protective film 17 is referred to as an "overcoat," according to need.

On the end faces and the back face of the insulative substrate 1, end-face electrodes 9a and 9b (e.g., Ni/Cr) and back-face electrodes 7a and 7b (Ag, Cu, or a conductive adhesive agent) are provided, respectively. The plated layers 13a and 3b made of Ni, Sn, or the like that cover such electrodes are further formed.

Figure 11:
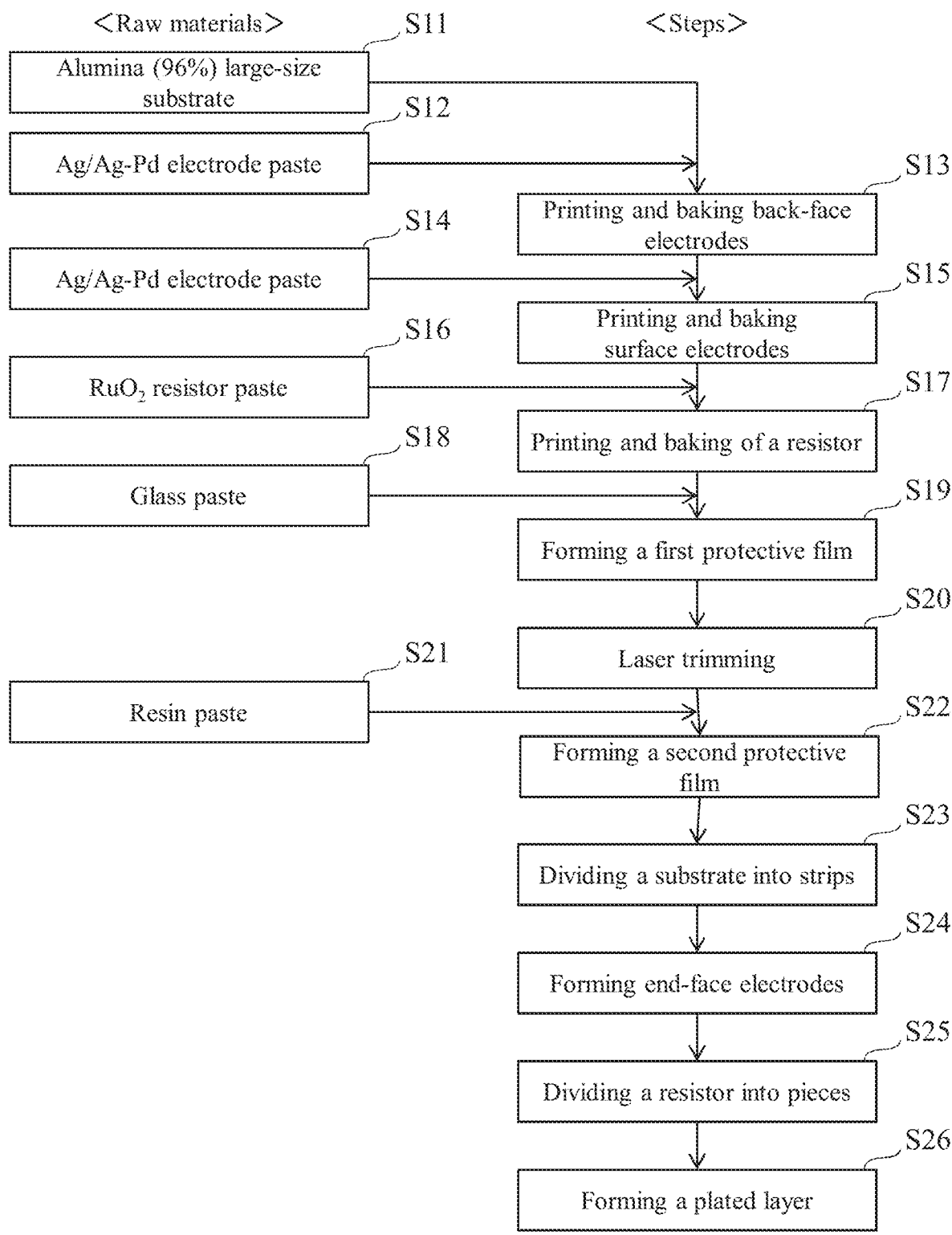
FIG. 11 illustrates a flow chart demonstrating an embodiment of producing process of the thick-film chip resistor illustrated in FIG. 10.

FIG. 11 illustrates a flow chart demonstrating an example of the step of producing the thick-film chip resistor illustrated in FIG. 10.

In Step S11, at the outset, a multiple-cavity large-size insulative substrate, such as an alumina substrate with the purity of 96%, is prepared. In Step S12, for example, an Ag/Ag—Pd electrode paste material is prepared. In Step S13, the Ag/Ag—Pd electrode paste material is, for example, screen-printed on a surface of the insulative substrate 1 as the back-face electrodes 7a and 7b, followed by baking. In Step S15, subsequently, surface electrodes 5a and 5b are, for example, screen-printed using the Ag/Ag—Pd electrode paste material prepared in Step S14 on a surface of the insulative substrate 1 opposite from the surface on which the back-face electrodes 7a and 7b are formed in Step 13, followed by baking.

In Step S16, an $RuO_2$ resistance element paste is prepared. In Step S17, subsequently, the resistance element 3 connected at its end to the surface electrodes 5a and 5b is, for example, screen-printed, followed by baking.

In Step S18, subsequently, a glass paste is prepared. In Step S19, the first protective film 11 is, for example, screen-printed on the resistance element 3, followed by baking.

The resistance value is then measured. In Step S20, a trimming groove 3a is formed via laser trimming to adjust a resistance value to a desirable level.

In Step S21, subsequently, the optimized allylphenol-maleimide-based resin composition according to the present embodiment is screen-printed on the resistance element 3 and on the first protective film 11 to cover at least the trimming groove 3a, and the optimized allylphenol-maleimide-based resin raw material composition is heat-cured at, for example, approximately 200° C. to form a second protective film 17.

In Step S23, the substrate 1 is cut into strips. In Step S24, end-face electrodes 9a and 9b are formed. In Step S25, the strips are divided to separate the resistor into pieces. In Step S26, external electrodes 13a and 13b are formed in, for example, the step of plating.

Thus, the resistor of the present embodiment is completed.

The resistance element 3, the back-face electrode 7a and 7b, the surface electrodes 5a and 5b, and the first and the second protective films 11 and 17 can be provided via screen printing. The first protective film 11 can be omitted.

Each of the surface electrodes 5a and 5b and the back-face electrode 7a and 7b may be formed in the same step, and these electrodes may be prepared in any order. The step of forming the resistance element may be followed by the step of forming the surface electrodes, and vice versa.

The end-face electrodes 9a and 9b can be formed by, for example, dividing the insulative substrate 1 into strips, followed by sputtering.

In the present embodiment, a protective film is composed of 2 layers. It should be noted that the first protective film 11 may not be formed, and a protective film can be formed of a single layer.

The results of evaluation of the thick-film chip resistor including the second protective film made from the optimized allylphenol-maleimide copolymer according to the present embodiment prepared in the manner described above are described.

(Evaluation of Insulation Resistance of Thick-Film Chip Resistor)

Figure 12:
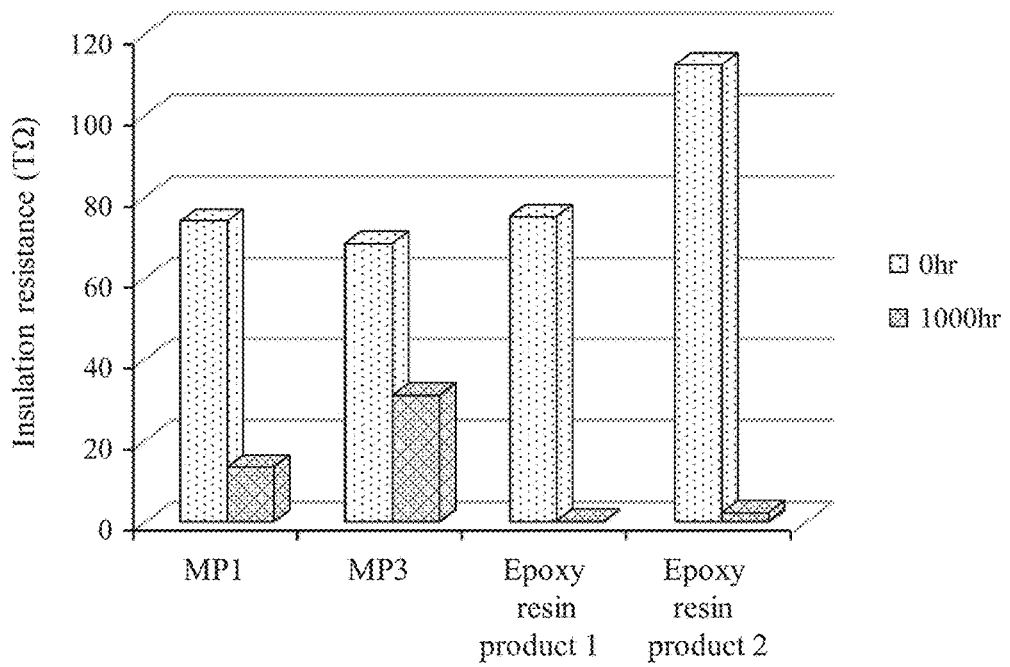
FIG. 12 illustrates the results of evaluation of the conditions of the products in terms of changes in the insulation resistance before and after the high-temperature storage test (H250) conducted for 1,000 hours (n=5).

FIG. 12 illustrates the results of evaluation of the conditions of the products in terms of changes in the insulation resistance before and after the high-temperature storage test (H250) conducted for 1,000 hours (n=5).

Concerning the optimized allylphenol-maleimide copolymers MP1 and MP3 according to the present embodiment (see Table 1), the insulation resistance of MP1 was reduced from 74 TΩ to 14 TΩ, and that of MP3 was reduced from 69 TΩ to 31 TΩ after the storage at 250° C. for 1,000 hours. That is, both MP1 and MP3 yield high insulation resistance of approximately 10 TΩ. In comparison with the case in which common-type epoxy resin products 1 and 2 are used for protective films, an extent of lowering in the insulation resistance induced by heating is found to be smaller. This demonstrates that sufficient insulation resistance can be attained when MP1 and MP3 are applied to products in the form of a protection film paste.

The insulation resistance of the epoxy resin product 1 and that of the epoxy resin product 2 were found to have lowered to a significant extent from 75 TΩ to 0.28 TΩ and from 112 TΩ to 1.9 TΩ, respectively, after the H250 test conducted for 1,000 hours. Such lowered insulation resistance was confirmed in the form of products.

(Results of Long-Term Life Test for Insulation Resistance of Thick-Film Chip Resistor)

Subsequently, the results of the long-term storage tests at 250° C. including tests for the optimized allylphenol-maleimide copolymers MP1 and MP3 according to the present embodiment (see Table 1) are described. For comparison, the results of epoxy resin (a common product and a heat-resistant product) are also illustrated.

Figure 13:
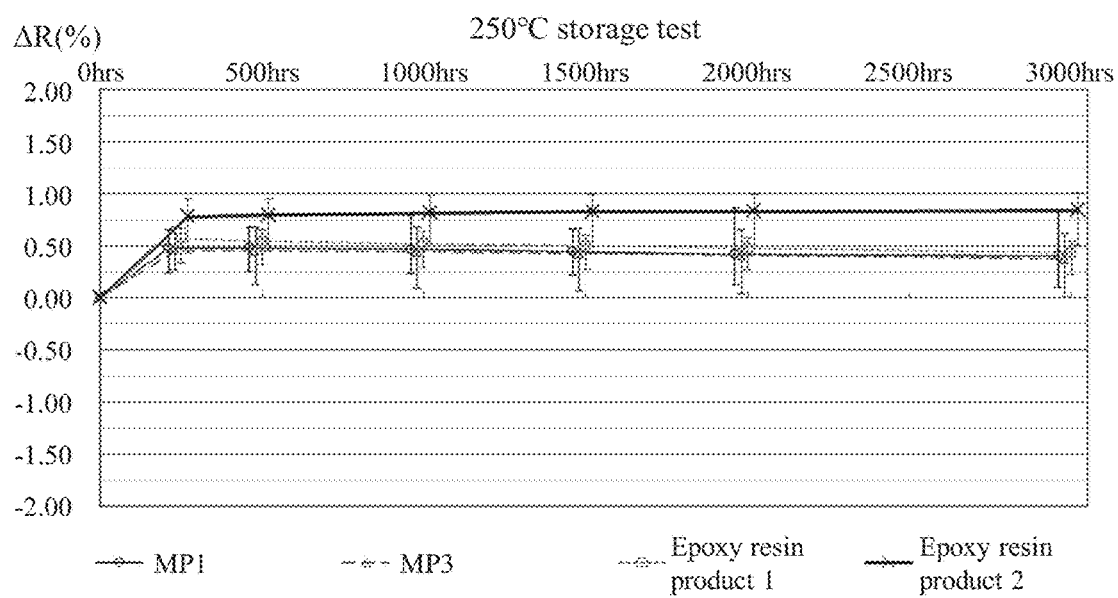
FIG. 13 illustrates changes in ΔR of the thick-film chip resistor subjected to the high-temperature storage test (H250, storage test at 250° C.).

FIG. 13 illustrates changes in ΔR of the thick-film chip resistor subjected to the high-temperature storage test (H250, storage test at 250° C.).

As illustrated in FIG. 13, the conventional epoxy resin product 1 exhibited a change in the resistance value ΔR of +0.8% or more as a result of the H250 test conducted for 3,000 hours.

In contrast, both the allylphenol-maleimide copolymers MP1 and MP3 and the epoxy resin product 2 exhibited ΔR of less than ±0.5% as a result of the H250 test conducted for 3,000 hours.

The above results demonstrate that use of the optimized allylphenol-maleimide copolymers MP1 and MP3 according to the present embodiment would exhibit a change in the resistance value smaller than the conventional epoxy resin 1.

A change in the resistance value ΔR is large at the initial stage because a strain occurred on the resistance element at the time of laser trimming of the resistance element is restored. That is, an influence of the protective film is considered insignificant.

(Results of Moisture Load Life Test of Thick-Film Chip Resistor)

The moisture load life test is carried out at various temperature and relative humidity conditions described below in an incubator (ESPEC PL-3J) by repeating a cycle of voltage application 15 hours and withdrawal for 0.5 hours for 3,000 hours, during which the resistance is measured. A voltage applied to the resistor is 75 V.

Figure 14:
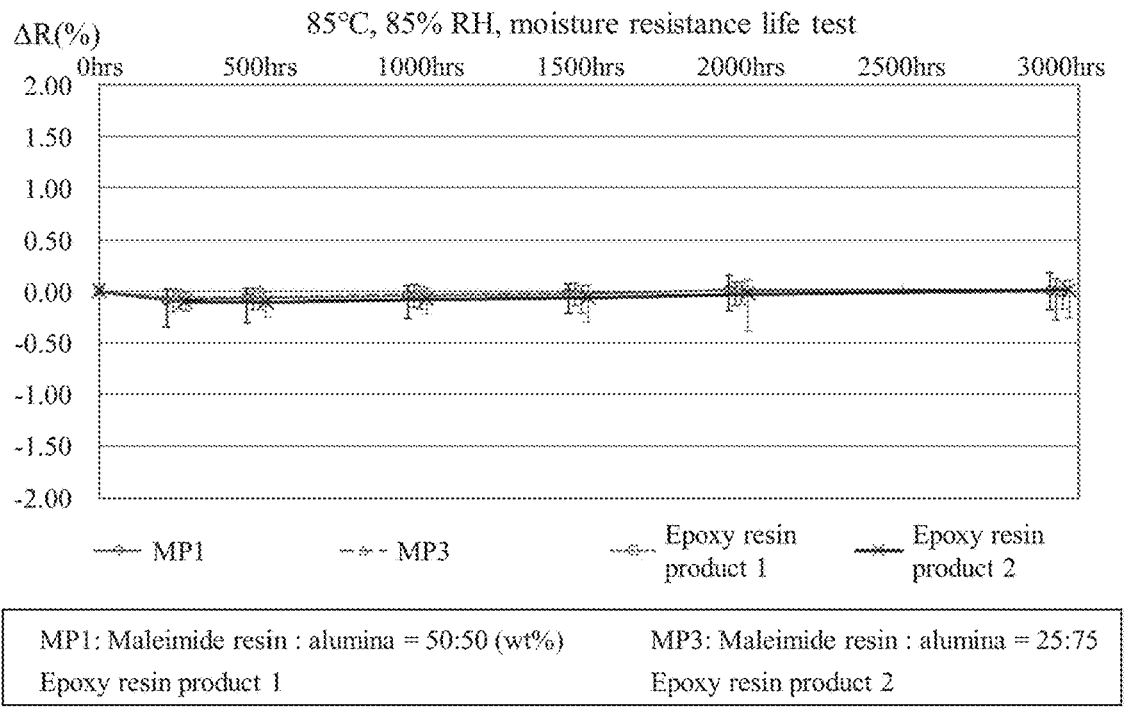
FIG. 14 illustrates a change in ΔR upon the moisture load life test (MR85, 85° C., 85% RH, with loading of voltage application at 75 V) with the elapse of time (n=20).

FIG. 14 illustrates a change in ΔR upon the moisture load life test (MR85, 85° C., 85% RH, with loading) with the elapse of time (n=20). The sample used is the same as the case illustrated in FIG. 13.

As illustrated in FIG. 14, substantially no differences were observed among samples after the MR85 test conducted for 3,000 hours, and ΔR was satisfactorily less than ±0.1%.

Figure 15:
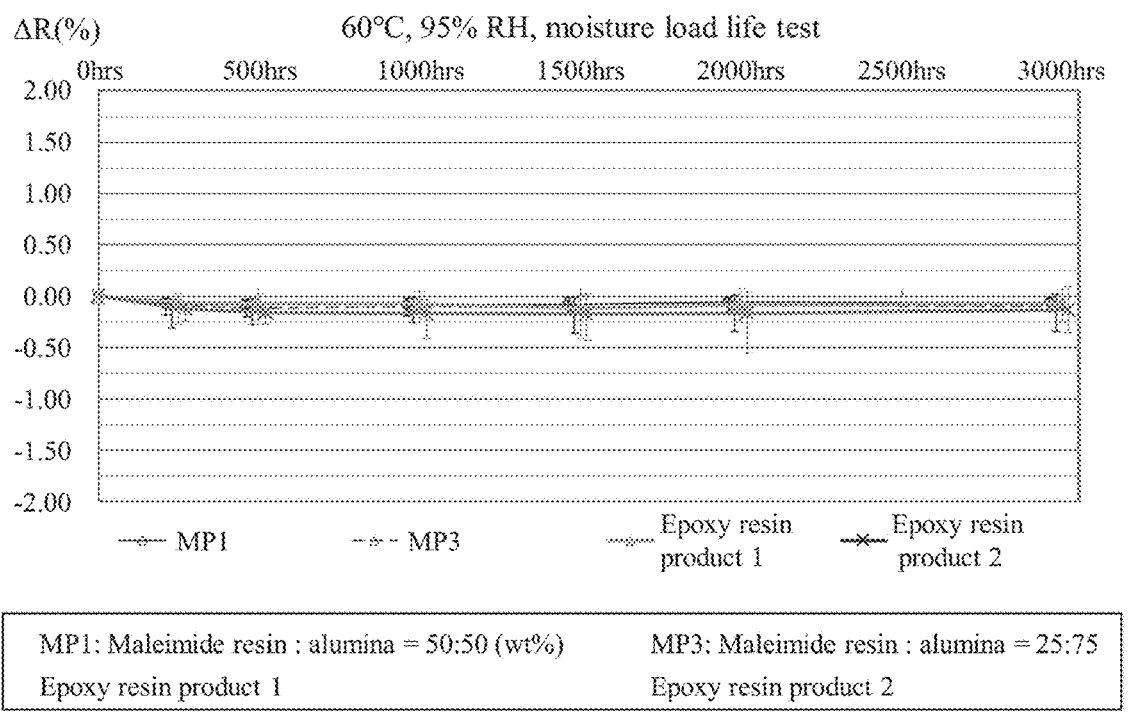
FIG. 15 illustrates changes in ΔR upon the moisture load life test (MR60, 60° C., 95% RH, with loading of voltage application at 75 V) with the elapse of time (n=20).

FIG. 15 also illustrates changes in ΔR upon the moisture load life test (MR60, 65° C., 95% RH, with loading) with the elapse of time (n=20).

As illustrated in FIG. 15, substantially no differences were observed among samples after the MR60 test conducted for 3,000 hours, and ΔR was satisfactorily less than ±0.2%.

(Results of Moisture Resistance Life Test of Thick-Film Chip Resistor)

Figure 16:
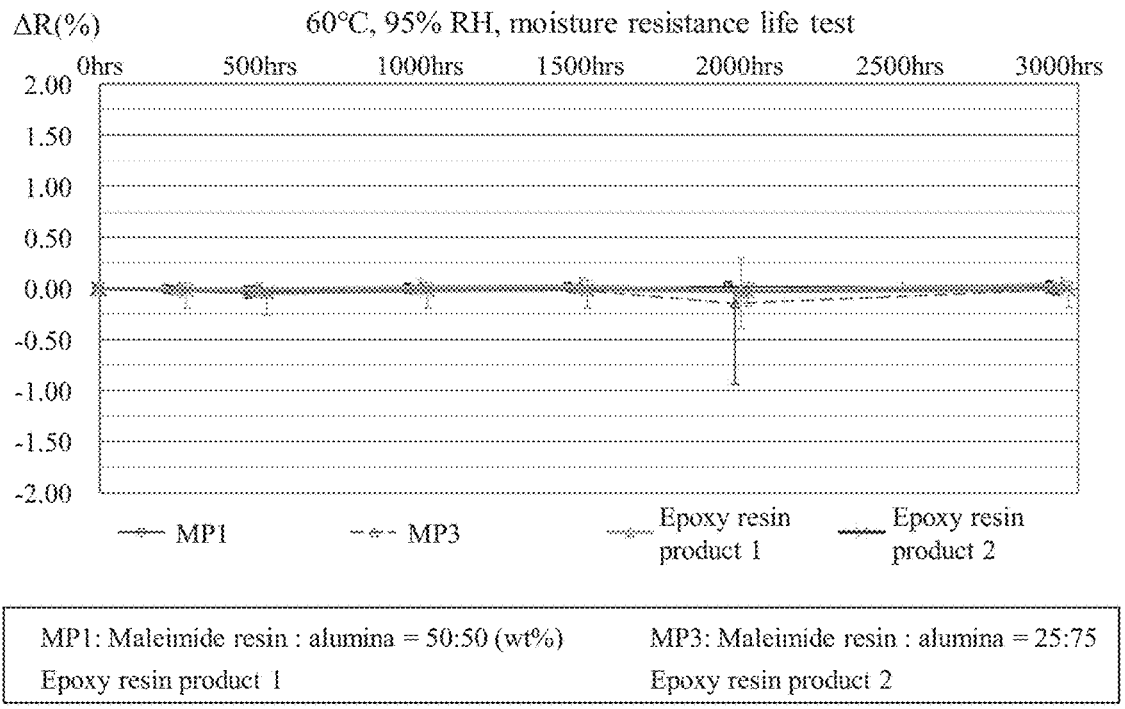
FIG. 16 illustrates changes in ΔR upon the moisture resistance life test (M60, 60° C., 95% RH, without loading) with the elapse of time (n=20).

FIG. 16 illustrates changes in ΔR upon the moisture resistance life test (M60, 60° C., 95% RH, without loading) with the elapse of time (n=20).

As illustrated in FIG. 16, substantially no differences were observed among samples after the MR60 test conducted for 3,000 hours, and ΔR was satisfactorily less than ±0.1%.

When the optimized allylphenol-maleimide copolymers MP1 and MP3 according to the present embodiment are used, the results of the moisture load life test and those of the moisture resistance life test are satisfactory; that is, changes in resistance value over time are very small. Such satisfactory results are considered to be attained for the following reasons. That is, the internal stress of a protective film including the allylphenol-maleimide copolymer according to the present invention is reduced with the aid of resin having a flexible structure constituting such copolymer. This can enhance adhesion of the protective film to glass surface of the first protective film and the surface of other materials of a resistor such as an electrode, the invasion of a moisture through the interface can be prevented, and moisture resistance is thus enhanced.

(Results of Temperature Cycle Test of Thick-Film Chip Resistor)

Figure 17:
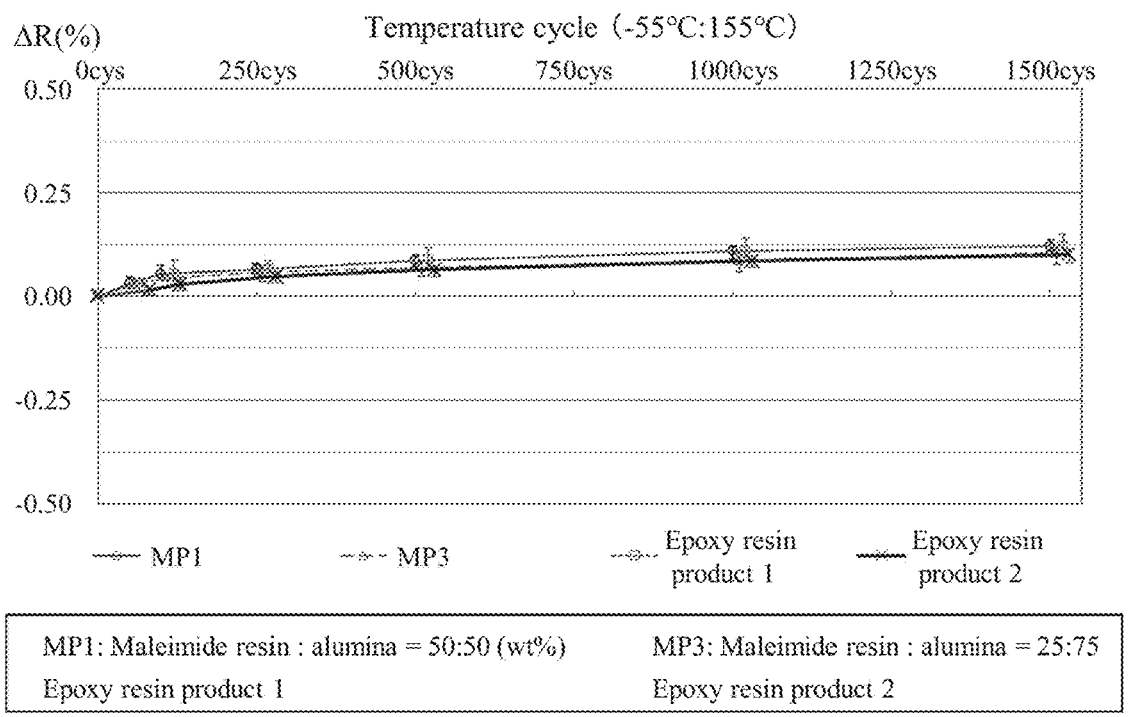
FIG. 17 illustrates changes in ΔR upon the temperature cycle test (−55/155° C.) with the elapse of time (n=20).

FIG. 17 illustrates changes in ΔR upon the temperature cycle test (−55/155° C.) with the elapse of time (n=20).

As illustrated in FIG. 17, substantially no differences were observed among samples after the temperature cycle test performed 1,500 times, and ΔR was satisfactorily approximately +0.1%.

As described above, a novel protective film for an electronic component that is excellent in heat resistance and in moisture resistance can be provided with the use of the allylphenol-maleimide-based resin composition according to the present embodiment. In addition, a protective film for an electronic component that can be cured at low temperature within a short period of time can be provided.

The allylphenol-maleimide-based resin composition according to the present invention can be used for protective films of various electronic components. Examples of electronic components to which such protective films can be applied include, in addition to a chip resistor, a capacitor, a chip fuse, and a varistor.

It should be noted that the present invention is not limited by the configurations and the like demonstrated in the figures and that such configurations and the like can be adequately modified, provided that the effects according to the present invention are exerted. Further, the present invention can be adequately modified within the scope of the present invention.

In addition, the components of the present invention can be adequately selected, and inventions provided with the selected constituents are within the scope of the present invention.

INDUSTRIAL APPLICABILITY

The present invention can be used for a protective film of a resistor.

All publications, patents, and patent applications cited herein are incorporated herein by reference in their entirety.

The invention claimed is:

1. A resin composition for preparing an allylphenol-maleimide copolymer used for a protective film for an electronic component comprising:
   (A) an allyl group-containing phenol compound having a rigid structure;
   (B) an N-aromatic maleimide group-containing compound having a rigid structure; and
   (C) an N-aliphatic maleimide group-containing compound having a flexible structure;
   wherein Compound (A) is represented by Formula 1 below, Compound (B) is represented by Formula 2 below, and Compound (C) is represented by Formula 3 below;
   wherein an equivalence ratio of the allyl group-containing phenol compound having the rigid structure (A) to a total of the N-aromatic maleimide group-containing compound having the rigid structure (B) and the N-aliphatic maleimide group-containing compound having the flexible structure (C) is from 1:1 to 1:3; and
   wherein an equivalence ratio of the N-aromatic maleimide group-containing compound having the rigid structure (B) to the N-aliphatic maleimide group-containing compound having the flexible structure (C) is from 1:0.6 to 1:1.6,

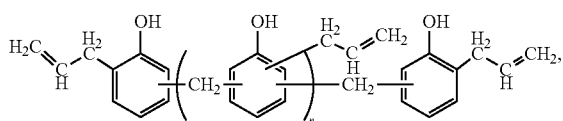

Formula 1 wherein n is 1 or 2;

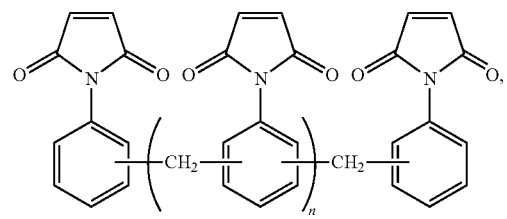

Formula 2 wherein n is 0 to 2;

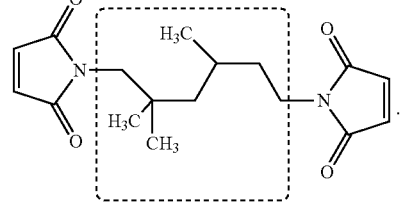

Formula 3

2. The resin composition according to claim 1, wherein the resin composition further comprises spherical alumina particles as inorganic fillers.

3. The resin composition according to claim 2, wherein a content of the inorganic fillers in the resin composition is from 50% to 75% by weight.

4. A method for producing an allylphenol-maleimide copolymer used for a protective film for an electronic component comprising curing the resin composition according to claim 1 via heating.

5. A protective film for an electronic component comprising an allylphenol-maleimide copolymer, which is a heat-cured product of the resin composition according to claim 1.

6. An electronic component comprising:
   an insulative substrate;
   a pair of electrodes formed to face at least one surface of the insulative substrate;
   a resistance element that electrically connects the pair of electrodes;
   a first protective film that covers the resistance element; and
   a second protective film that covers the first protective film and is formed of the allylphenol-maleimide copolymer according to claim 5.

7. The method according to claim 4, wherein the curing is carried out at from 200° C. to 250° C. for from 15 to 30 minutes.

8. The protective film according to claim 5, wherein a thickness of the protective film is from 10 to 15 μm.

* * * * *